(12) United States Patent
Rodniansky

(10) Patent No.: US 10,009,348 B2
(45) Date of Patent: Jun. 26, 2018

(54) HYBRID DATABASE ACCESS CONTROL IN EXTERNAL-TO-DATABASE SECURITY SYSTEMS

(71) Applicant: International Business Machines Corporation, Armonk, NY (US)

(72) Inventor: Leonid Rodniansky, Allston, MA (US)

(73) Assignee: International Business Machines Corporation, Armonk, NY (US)

( * ) Notice: Subject to any disclaimer, the term of this patent is extended or adjusted under 35 U.S.C. 154(b) by 220 days.

(21) Appl. No.: 15/151,974

(22) Filed: May 11, 2016

(65) Prior Publication Data

US 2017/0331826 A1    Nov. 16, 2017

(51) Int. Cl.
*H04L 29/06* (2006.01)

(52) U.S. Cl.
CPC .............. *H04L 63/10* (2013.01); *H04L 63/08* (2013.01); *H04L 63/20* (2013.01)

(58) Field of Classification Search
CPC ....................................................... H04L 63/10
USPC ............................................................. 726/1
See application file for complete search history.

(56) References Cited

U.S. PATENT DOCUMENTS

| | | | |
|---|---|---|---|
| 6,963,959 B2 | 11/2005 | Hsu et al. | |
| 7,426,512 B1 * | 9/2008 | Ben-Natan | .............. G06F 21/55 |
| 7,506,371 B1 | 3/2009 | Ben-Natan | |
| 7,904,454 B2 | 3/2011 | Raab | |
| 7,904,545 B2 * | 3/2011 | Golovchinsky | ... G06F 17/30817 |
| | | | 707/705 |
| 8,495,367 B2 * | 7/2013 | Ben-Natan | .......... H04L 63/0428 |
| | | | 713/154 |
| 2005/0079859 A1 | 4/2005 | Eakin | |
| 2005/0289312 A1 | 12/2005 | Ghosal et al. | |
| 2008/0016310 A1 | 1/2008 | Ghosal et al. | |
| 2008/0104431 A1 | 5/2008 | Shimada | |
| 2014/0237538 A1 | 8/2014 | Rodniansky | |

OTHER PUBLICATIONS

Anonymous, "A method for a performance-predictive planning UI for placement of database tasks used by database administrators," IP.com, IPCOM000201998D, Nov. 30, 2010.

(Continued)

*Primary Examiner* — Longbit Chai
(74) *Attorney, Agent, or Firm* — Jeffrey S. La Baw; Jack V. Musgrove

(57) ABSTRACT

Hybrid database access control in external-to-database security systems is achieved by selectively operating a database server system in different security modes. During low traffic, access to the server is monitored by an agent subject to access policies (LSP) stored at an external security device (ESD). During high traffic, access is monitored by the server itself subject to access policies (DSP). The ESD translates an access policy (LSP) to an access policy (DSP) supported by the server. Thereafter the agent intercepts session login information and transmits it to the ESD, which determines an access policy is relevant to the session, updates the session login information according to database protocol rules, and sends the updated session login information to the agent. The agent releases the updated session login information to the server which allows a session based on the particular objects access rules (DSP) corresponding to the updated session login information.

20 Claims, 5 Drawing Sheets

(56) References Cited

OTHER PUBLICATIONS

Anonymous, "Provisioning Content Relevant to a Predicted Future Circumstance," IP.com, IPCOM000207125D, May 17, 2011.

Dataversity, "Nov 26 Webinar: Migrating Security Policies from SQL to NoSQL" [online], retrieved on Apr. 18, 2016 from the Internet URL: http://www.dataversity.net/nov-26-webinar-database-security-trends-in-nosql/ (2013).

Forrester Research, "The Total Economic Impact of IBM Security Guardium" [online], retrieved on Feb. 1, 2016 from the Internet URL: http://www-01.ibm.com/common/ssi/cgi-bin/ssialias?htmlfid=WGL03096USEN&appname=WWWSEARCH (Sep. 2015).

Hexatier, "Security Best Practices for Migrating your Database to the Cloud" [online], retrieved on May 6, 2016 from the Internet URL: http://www.hexatier.com/security-best-practices-for-migrating-your-database-to-the-cloud/ (Oct. 22, 2015).

IBM, "Data security and protection" [online], retrieved on Mar. 29, 2016 from the Internet URL: http://www-03.ibm.com/software/products/en/category/data-security.

Oracle, "Oracle® Fusion Middleware Administering JDBC Data Sources for Oracle WebLogic Server" "10 Understanding Data Source Security" [online], retrieved on Apr. 18, 2016 from the Internet URL: https://docs.oracle.com/middleware/1212/wls/JDBCA/ds_security.htm#JDBCA477 (2016).

Zhu, Hong et al., "Fine-Grained Access Control for Database Management System" v (Abstract) [online], retrieved on Apr. 18, 2016 from the Internet URL: http://link.springer.com/chapter/10.1007/978-3-540-73390-4_24 (2007).

\* cited by examiner

110

```
00000000: 03 db 00 00 06 00 00 00 00 00 03 73 03 fe ff ff  ...........s....
00000010: ff ff ff ff ff 05 00 00 00 01 01 00 00 fe ff ff  ................
00000020: ff ff ff ff ff 12 00 00 00 ff 7f 00 00 fe ff ff  ................
00000030: ff ff ff ff ff fe ff ff ff ff ff ff ff 05 61 6c  ..............al
00000040: 69 63 65 0c 00 00 00 0c 41 55 54 48 5f 53 45 53  ice.....AUTH_SES
00000050: 53 4b 45 59 60 00 00 00 fe 40                    SKEY`....@
```

```
00000000: 04 03 00 00 06 00 00 00 00 00 03 73 03 fe ff ff  ...........s....
00000010: ff ff ff ff ff 05 00 00 00 01 01 00 00 fe ff ff  ................
00000020: ff ff ff ff ff 13 00 00 00 ff 7f 00 00 fe ff ff  ................
00000030: ff ff ff ff ff fe ff ff ff ff ff ff ff 05 61 6c  ..............al
00000040: 69 63 65 11 00 00 00 11 50 52 4f 58 59 5f 43 4c  ice.....PROXY_CL
00000050: 49 45 4e 54 5f 4e 41 4d 45 07 00 00 00 07 6c 64  IENT_NAME.....ld
00000060: 61 63 73 5f 31 00 00 00 00 0c 00 00 00 0c 41 55  acs_1.........AU
00000070: 54 48 5f 53 45 53 53 4b 45 59 60 00 00 00 fe 40  TH_SESSKEY`....@
```

*FIG. 6B*

HYBRID DATABASE ACCESS CONTROL IN EXTERNAL-TO-DATABASE SECURITY SYSTEMS

BACKGROUND OF THE INVENTION

Field of the Invention

The present invention generally relates to computer systems, and more particularly to a method of implementing database security with access control.

Description of the Related Art

Computer system and software designers have devised a variety of security features to restrict access or grant privileges to different aspects of a computer program. The most common of these is a unique user identifier or username which is usually provided in combination with a confirmation code or password. This login information allows a user to be authenticated, and then corresponding access controls can be implemented according to the particular computer system involved.

One example of a computer system which provides for user authentication and access control is a database server. The term "database server" denotes a computer system which retains information in the form of a database and provides that information to users (database clients). The hardware for a database server might be a single computer system, but often a single "server" is actually composed of multiple computers, e.g., multiple server drawers in a rack with each server drawer providing various processing functions. A server may have a centralized memory device, or may use a distributed memory system. The information in the database may be stored in various conventional formats, using custom or off-the-shelf products such as Oracle, DB2, IBM Informix, or Microsoft SQL (this list is not exhaustive).

These and other popular databases have internal mechanisms (e.g., roles and privileges) for controlling database user access to database objects, sometimes referred to as a database access control module (DACM). The following are examples related to an Oracle database, where a privileged database user or database administrator restricts access on a database table "EMP" for database user "ALICE":

REVOKE UPDATE, INSERT, DELETE ON TABLE EMP FROM ALICE;
GRANT SELECT ON TABLE EMP TO ALICE;

Based on these database statements, ALICE will be able to read from table EMP, but will not be allowed to make changes.

DACMs are very effective , but from security systems point of view they are not comprehensive. They control database users and their access to database objects only. DACMs do not deal with parameters external to database server, like network addresses (internet protocol, or IP, addresses), operating system user, media access control (MAC) addresses, etc. DACMs are also security vulnerable because they do not support the "separation of duties " (SoD) concept and can be managed by power database application users or uncontrolled database administrators. The idea of protection of database objects (supporting the SoD concept) is embodied in network database access control systems (DACS), for example, such as the system described in U.S. Pat. No. 7,904,454. Local DACS (LDACS) is very important in intrusion detection systems. Its ability to control secured database access and access to database from privileged local users like database administrators is an advantage over network DACS.

The leading solution of LDACS is implemented in the Infosphere Guardium product marketed by International Business Machines Corp. One example of LDACS processing 2 is seen in FIG. 1. A database client 4 wants to communicate with a database server host 6 over a network 8, such as a local area network (LAN) or the Internet. Database client 4 begins the communications by providing session login information. Database server host 6 includes a lightweight agent 10 and a database server 12. Agent 10 intercepts all requests sent between database client 4 and database server 12 on an inter-process communication (IPC) level without secured access or cryptographic method invocation level with secured access. Agent 10 is not aware of any database protocols. It forwards a packet containing intercepted requests through a network 16 (which may or may not be the same as network 8) for further analysis to an external security device (ESD) 14 residing outside of database server host 6. Agent 10 holds the database client request and waits for a decision (verdict) from ESD 14. ESD 14 extracts information about the accessed database object and validates database session security policies. If a security policy would be violated by the request, then ESD 14 responds to agent 10 with a verdict such as "DROP DATABASE SESSION" which means that agent 10 must interrupt the database session. If no security policy is violated by the request, ESD 14 responds to agent 10 with the verdict "RELEASE DATABASE REQUEST" which means that agent 10 will release the database client request to database server 12. Analysis of database requests and security policies validation are CPU and memory intensive, so it is advantageous to pass these functions to ESD 14. Further details of LDACS processing can be found in U.S. Pat. Nos. 7,426,512 and 8,495,367, which are hereby incorporated.

SUMMARY OF THE INVENTION

The present invention in at least one embodiment is generally directed to a hybrid method of controlling access to a database by selectively operating a database server system in one of two security modes depending upon real-time database traffic. In the case of low traffic, access to the database server can be monitored by an agent subject to database access policies (LSPs) stored at an external security device. In the case of high traffic, access to the database server can be monitored by the database server itself subject to database objects access rules (DSPs) stored at the database server. According to a preferred implementation of the latter operating mode, the external security device (separate from the database server) receives an LSP which includes at least one rule indicative of allowable access to the database server. The external security device translates the LSP to a DSP which includes database statements supported by the database server. The agent then installs the DSP on the database server. Thereafter, when a database client wishes to start a new database session (during a time of high traffic rate), the agent intercepts the initial session login information in the form of database protocol packets and transmits it to the external security device. The external security device determines that an LSP is relevant to the initial session login information, transforms the initial session login information into updated session login information according to database protocol rules, and sends the updated session login information to the agent. The agent then releases the updated session login information to the database server which allows a database session for the database client based on the DSP corresponding to the updated session login information. Translation of the database access policy can include defining a proxy user for the database server and establishing privileges for the proxy user based on the DSP, and the updated session information can reference this proxy user. The LSP can include for example a network address for the database client, a username for the database client, and a database operating system for the database client. As the database session proceeds, if the database server determines that a particular access request violates the DSP, it can directly deny the access request and send an error response to the external security device indicating a violation of the DSP.

The above as well as additional objectives, features, and advantages in the various embodiments of the present invention will become apparent in the following detailed written description.

BRIEF DESCRIPTION OF THE DRAWINGS

The present invention may be better understood, and its numerous objects, features, and advantages of its various embodiments made apparent to those skilled in the art by referencing the accompanying drawings.

FIGS. 6A and 6B are database protocol packets representing examples of initial session login information and updated session login information in accordance with one implementation of the present invention.

The use of the same reference symbols in different drawings indicates similar or identical items.

DESCRIPTION OF THE PREFERRED
EMBODIMENT(S)

Figure 1:
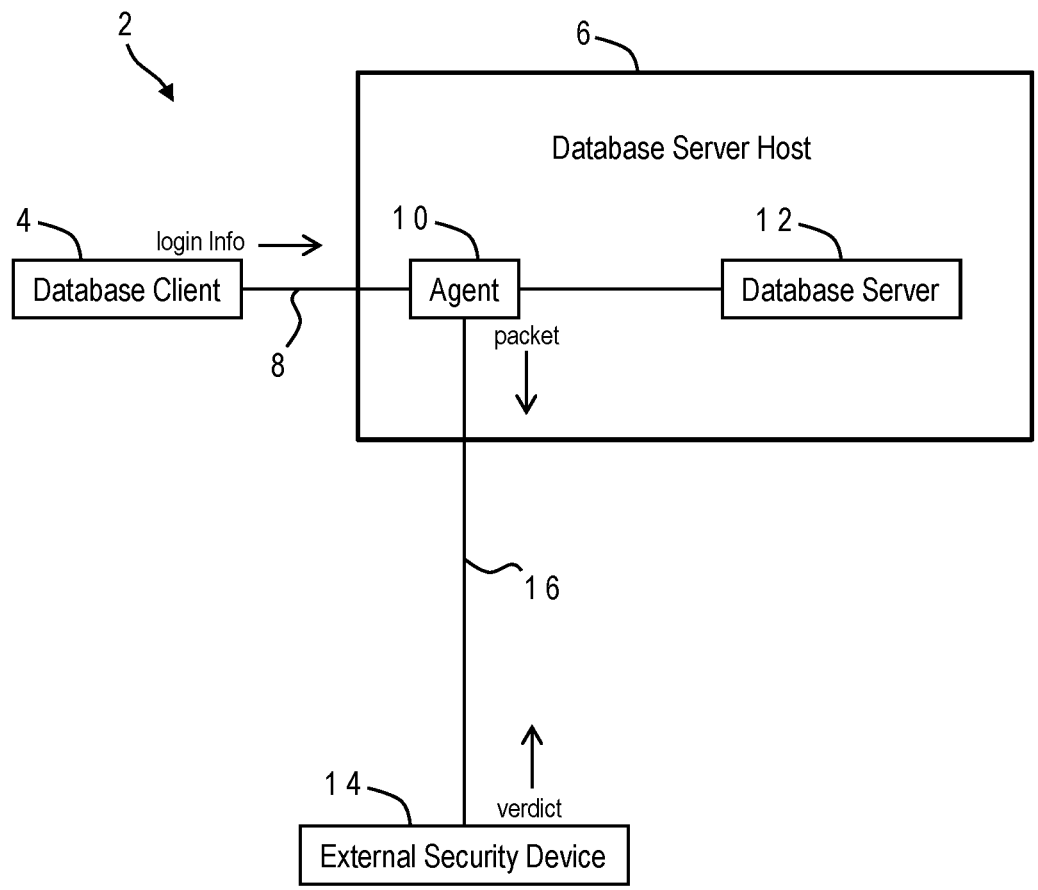
FIG. 1 is a high-level block diagram of a conventional database server system using local database access control system (LDACS) processing.

The LDACS processing scheme of FIG. 1 has many important advantages, including capability to block secure and not secure database access, capability to block local and network database traffic, database independency and capability to protect different database types installed on the same database host, and compactness and limited resource consumption by the database server host. However, one significant disadvantage of such an LDACS processing scheme is that there can be an extended period of time when the agent withholds the database request from the server. This hold time $t_h$ can be roughly calculated as:

$$t_h \geq t_{n1} + t_a + t_{n2}$$

where $t_{n1}$ is the interval of time between the agent sending and the external security device receiving the network packet, $t_a$ is the time needed for request processing by the external security device, and $t_{n2}$ is the interval of time between the external security device sending and the agent receiving the verdict packet. This hold time $t_h$ relates to every packet sent to the external security device from the agent, and can be the reason for considerable slow down of the database client application. This disadvantage of the LDACS scheme can make the system infeasible in the case of high rate database traffic.

Another disadvantage relates to the fact that the agent is not aware of any database protocols. As a result, in case of a security violation, it simply drops the database session instead of presenting a violation statement. It would, therefore, be desirable to devise an improved method of database access control that is free from these disadvantages. It would be further advantageous if the method could retain the benefits of LDACS processing when desirable, but without requiring any changes in database client applications. These objects are achieved in a hybrid database access control method which can selectively offload a portion of the access control efforts to the database server. According to such a hybrid scheme, the database client application is not aware of any changes in database access control.

Figure 2:
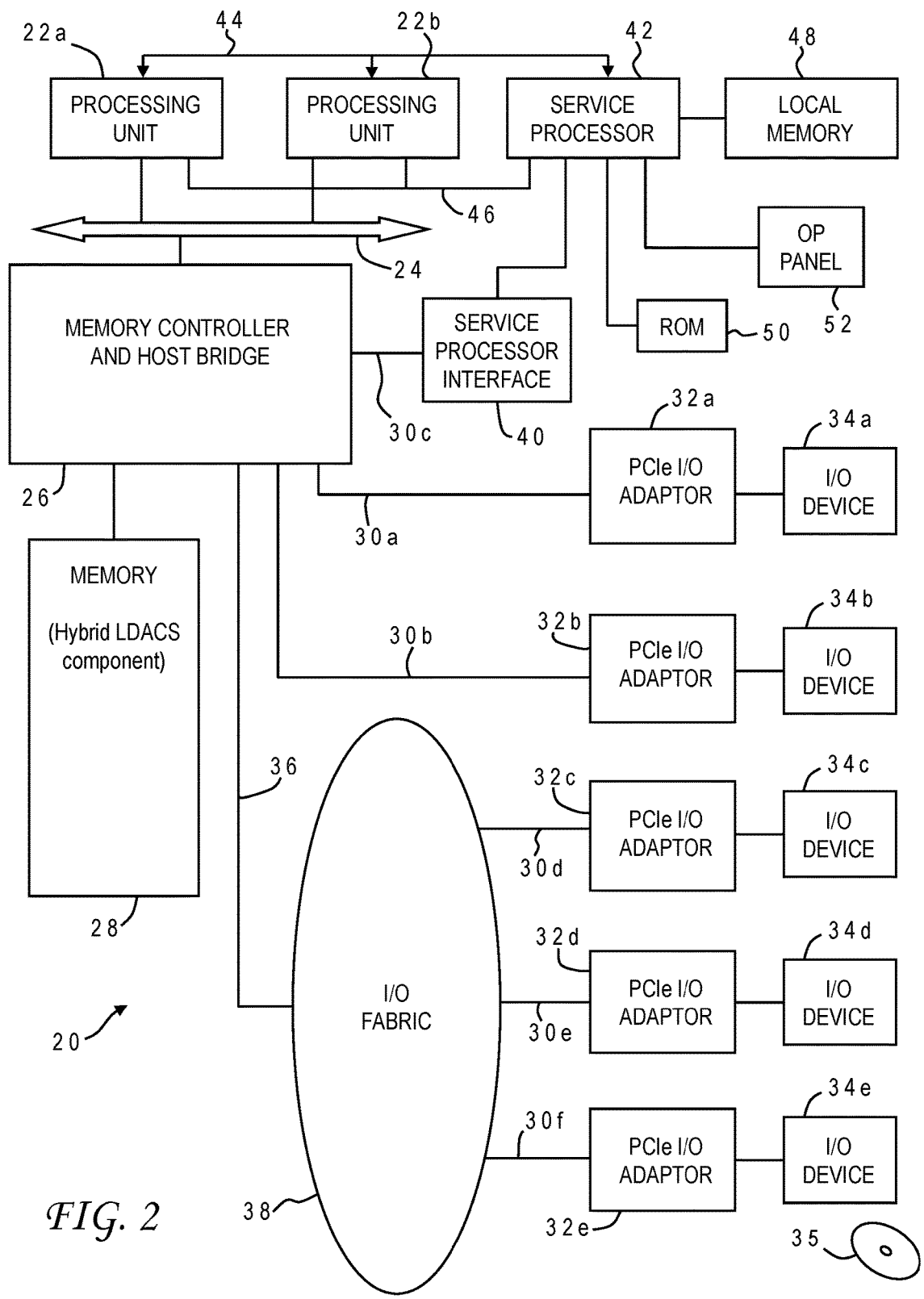
FIG. 2 is a block diagram of a computer system programmed to carry out one or more features of database access control in accordance with one implementation of the present invention.

With reference now to the figures, and in particular with reference to FIG. 2, there is depicted one embodiment 20 of a computer system in which the present invention may be implemented to carry out access control for a database server system. The same or similar computer systems, or alternative systems, may be used to implement different components of the database access control. For example, computer system 20 may be used as a database server, as a database server agent, as an external security device, or as a database client workstation, the primary difference being which system components have been installed. Those skilled in the art will appreciate that computer system 20 is thus representative of a machine that may be used to carry out different functions according to the present invention, but other computer designs may serve these purposes.

In the depiction of FIG. 2, computer system 20 is a symmetric multiprocessor (SMP) system having a plurality of processors 22a, 22b connected to a system bus 24. System bus 24 is further connected to a combined memory controller/host bridge (MC/HB) 26 which provides an interface to system memory 28. System memory 28 may be a local memory device or alternatively may include a plurality of distributed memory devices, preferably dynamic random-access memory (DRAM). There may be additional structures in the memory hierarchy which are not depicted, such as on-board (L1) and second-level (L2) or third-level (L3) caches. System memory 28 has loaded therein a hybrid local database access control system (hybrid LDACS) application or component thereof in accordance with the present invention.

MC/HB 26 also has an interface to peripheral component interconnect (PCI) Express links 30a, 30b, 30c. Each PCI Express (PCIe) link 30a, 30b is connected to a respective PCIe adaptor 32a, 32b, and each PCIe adaptor 32a, 32b is connected to a respective input/output (I/O) device 34a, 34b. MC/HB 26 may additionally have an interface to an I/O bus 36 which is connected to a switch (I/O fabric) 38. Switch 38 provides a fan-out for the I/O bus to a plurality of PCI links 30d, 30e, 30f. These PCI links are connected to more PCIe adaptors 32c, 32d, 32e which in turn support more I/O devices 34c, 34d, 34e. The I/O devices may include, without limitation, a keyboard, a graphical pointing device (mouse), a microphone, a display device, speakers, a permanent storage device (hard disk drive) or an array of such storage devices, an optical disk drive which receives an optical disk 35 (one example of a computer readable storage medium) such as a CD or DVD, and a network card. Each PCIe adaptor provides an interface between the PCI link and the respective I/O device. MC/HB 26 provides a low latency path through which processors 22a, 22b may access PCI devices mapped anywhere within bus memory or I/O address spaces. MC/HB 26 further provides a high bandwidth path to allow the PCI devices to access memory 28. Switch 38 may provide peer-to-peer communications between different endpoints and this data traffic does not need to be forwarded to MC/HB 26 if it does not involve cache-coherent memory transfers. Switch 38 is shown as a separate logical component but it could be integrated into MC/HB 26.

In this embodiment, PCI link 30c connects MC/HB 26 to a service processor interface 40 to allow communications between I/O device 34a and a service processor 42. Service processor 42 is connected to processors 22a, 22b via a JTAG interface 44, and uses an attention line 46 which interrupts the operation of processors 22a, 22b. Service processor 42 may have its own local memory 48, and is connected to read-only memory (ROM) 50 which stores various program instructions for system startup. Service processor 42 may also have access to a hardware operator panel 52 to provide system status and diagnostic information.

In alternative embodiments computer system 20 may include modifications of these hardware components or their interconnections, or additional components, so the depicted example should not be construed as implying any architectural limitations with respect to the present invention. The invention may further be implemented in an equivalent cloud computing network.

When computer system 20 is initially powered up, service processor 42 uses JTAG interface 44 to interrogate the system (host) processors 22a, 22b and MC/HB 26. After completing the interrogation, service processor 42 acquires an inventory and topology for computer system 20. Service processor 42 then executes various tests such as built-in-self-tests (BISTs), basic assurance tests (BATs), and memory tests on the components of computer system 20. Any error information for failures detected during the testing is reported by service processor 42 to operator panel 52. If a valid configuration of system resources is still possible after taking out any components found to be faulty during the testing then computer system 20 is allowed to proceed. Executable code is loaded into memory 28 and service processor 42 releases host processors 22a, 22b for execution of the program code, e.g., an operating system (OS) which is used to launch applications and in particular a database access control component of the present invention, results of which may be stored in a hard disk drive of the system (an I/O device 34). While host processors 22a, 22b are executing program code, service processor 42 may enter a mode of monitoring and reporting any operating parameters or errors, such as the cooling fan speed and operation, thermal sensors, power supply regulators, and recoverable and non-recoverable errors reported by any of processors 22a, 22b, memory 28, and MC/HB 26. Service processor 42 may take further action based on the type of errors or defined thresholds.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Computer system 20 carries out program instructions for a database access control process that uses a novel hybrid approach to manage database security. Accordingly, a program embodying the invention may include conventional aspects of various database access control tools, and these details will become apparent to those skilled in the art upon reference to this disclosure.

Figure 3:
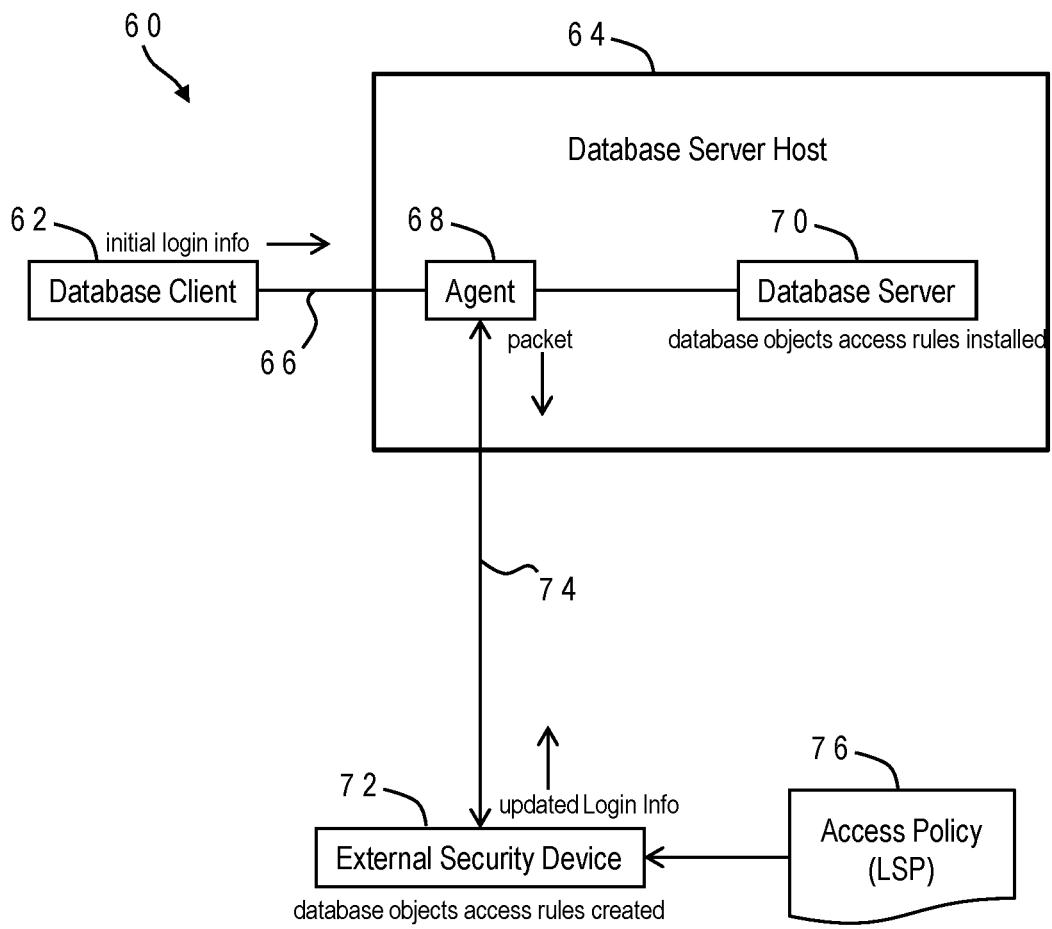
FIG. 3 is a high-level block diagram of a database server system using a hybrid scheme for providing database access control in accordance with one implementation of the present invention.

Referring now to FIG. 3, there is depicted a high-level block diagram of a database server system 60 which uses a hybrid scheme for providing database access control in accordance with one implementation of the present invention. In the illustrative implementation, system 60 includes a database client 62 which communicates with a database server host 64 over a network 66, such as a local area network (LAN) or the Internet. Database server host 64 is comprised of an agent 68 and a database server 70. Agent 68 can intercept all requests sent between database client 62 and database server 70, similar to the conventional agent interception described in conjunction with FIG. 1. However, agent 68 provides additional functionality as explained herein. Agent 68 does not need to be aware of any database protocols used by database server 70 in order to carry out these functions.

In some embodiments, agent 68 can selectively intercept initial session login information, and transmit that information to an external security device (ESD) 72. While ESD 74 may be co-located with database server host 64, ESD 72 may also be remote, in which case the communications with agent 68 are transmitted along network 74 which may or may not be the same as network 66. ESD 72 can provide a conventional verdict similar to that described in conjunction with FIG. 1, but can also provide additional functionality in accordance with the present invention. In particular, ESD can implement an alternative method of database access control wherein a portion of the access control efforts are relegated to database server 70. In such an implementation, ESD 72 is aware of certain predefined database access policies 76 which have been programmed or otherwise set, such as by a database administrator or system administrator. These policies may for example include an LDACS security policy (LSP). ESD 72 can translate an LSP into a database server security policy (DSP), which include one or more database statements supported by database server 70, according to the database platform being used. A DSP is specific for each database type (Oracle, DB2, MS SQL, etc.).

ESD 72 can then use the database access policies to transform the initial session login information into modified or updated session login information based upon the particular attributes of the client. To this end, ESD 72 can identify the specific database protocol rules that are relevant to the login information. For example, ESD 72 can determine that the initial session login information is coming from a client at a particular network (e.g., IP) address which is referenced (directly or indirectly) by the database access policies, and adjust the session login information according to database protocol rules to reflect a proxy user whose database access rights are controlled by appropriate database statements. ESD 72 can send the updated session login information in the form of database protocol packets back to agent 68 with a verdict indicating that session communications should be allowed. Agent 68 replaces the old session login information and releases the updated session login information to database server 70. From this point on, database access control of the database session can be performed by database server 70 according to the DSP, i.e., using a database access control module (DACM). Agent 68 does not need to hold database session packets anymore. If a database session request violates the DSP, then it will be denied by database server 70 directly because of insufficient access privileges. Database server error responses can be transferred by agent 68 to ESD 72 which can thus monitor and report any attempted violations.

Figure 4:
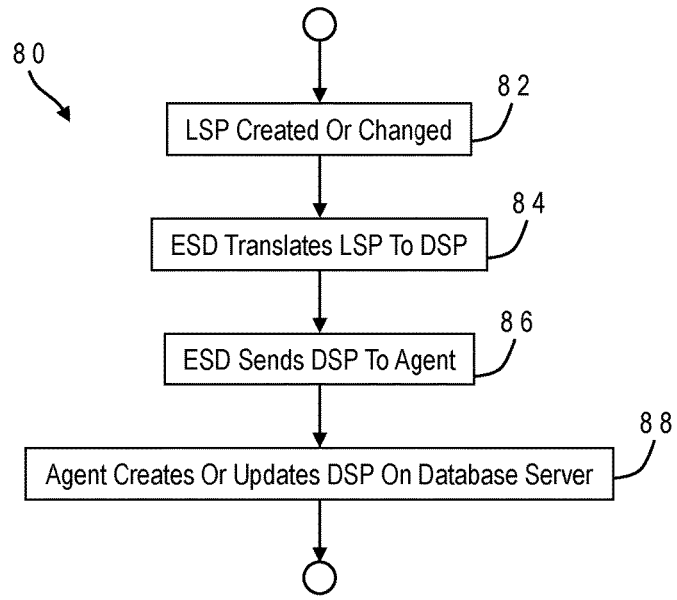
FIG. 4 is a chart illustrating the logical flow for translation of database (LDACS) security policies into database protocol rules and installation of those rules on a database server in accordance with one implementation of the present invention.

FIG. 4 further illustrates one manner in which the ESD can translate an LSP into a database server policy (DSP). This translation process 80 begins by creating or changing an LSP (82). The creation of a new LSP can be performed manually or via an automated process. The ESD translates the LSP to a DSP according to the particular database statements available in the database server platform (84). The ESD then sends DSP to the agent (86), and the agent subsequently creates or updates the DSP on the database server (88).

Aspects of the invention can thus represent a hybrid scheme consisting of selective LDACS and DACM (or other security techniques). In other words, the database server system can operate in a first security mode where access to the database server is monitored by the agent subject to a database access policy (LSP) stored at the external security device (LDACS), or can operate in a second security mode where access is monitored by the database server subject to database server security policies (DSP) stored at the database server (DACM). These two modes could even be used simultaneously, i.e., the system could operate in the first security mode for a first database client whose session was started during a time of low database traffic, and could operate in the second security mode for a second database client whose session was started during a time of high database traffic. The idea is to force the database server (without client application changes) to verify violations of LDACS security policies and to control access to database objects in cases of high traffic. LDACS will work in monitoring mode without imposing delays. Depending upon constraints imposed by the particular database system being used, a single client could start a session with LDACS and then as traffic got higher that same session could switch to DACM.

Figure 5:
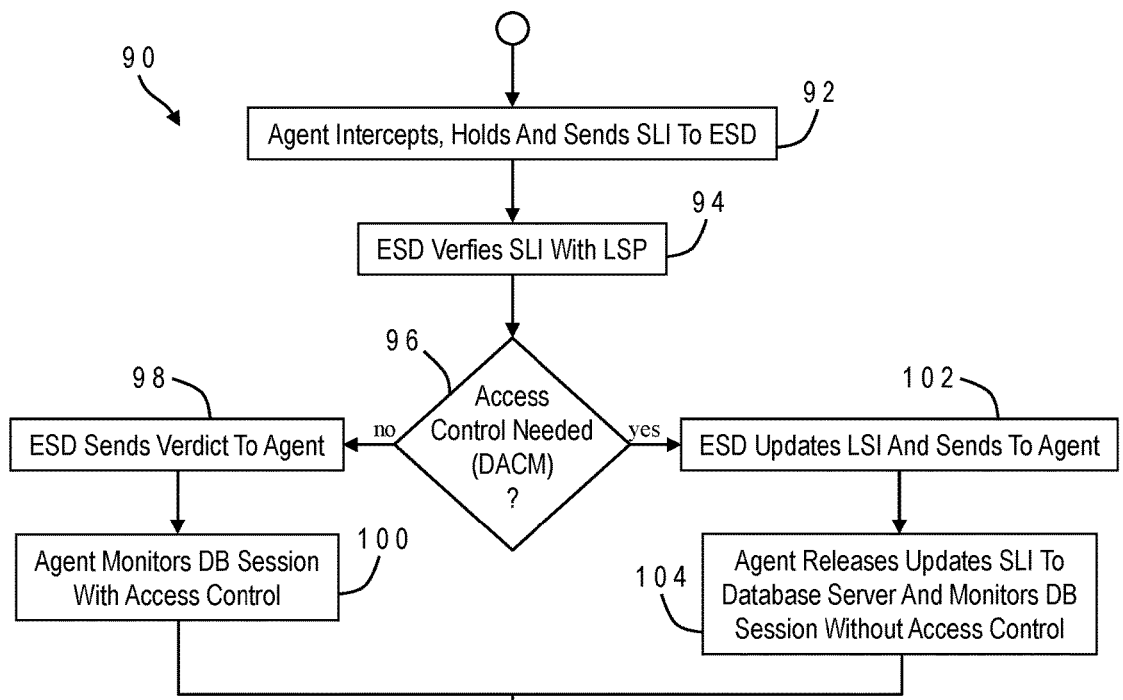
FIG. 5 is a chart illustrating the logical flow for hybrid database access control in accordance with one implementation of the present invention.

This hybrid scheme drastically increases throughput in case of database access control of high traffic rate database sessions. The overall operation 90 is seen in FIG. 5. This process begins when a new database client session starts with the agent receiving (intercepting) and holding the initial session login information (SLI), which is sent to the ESD in the form of database protocol packets (92). The ESD verifies the session login information with the database access policies, i.e., LSPs (94). A decision is then made on what type of access control is desired (96). This decision can be based on how high the database traffic is for the database server host in real-time, i.e., if the traffic is too high and the ESD is not capable of managing it, then access control will be delegated to the database server (DACM). If database access control (DACM) is not desired, the ESD sends a verdict back to the agent (i.e., the conventional approach of FIG. 1) indicating that the database session can proceed using the original session login information (98). In this case, the agent continues to monitor the session with access control (100). If database access control is desired, the ESD updates the session login information according to database protocol rules and sends it to the agent (102). The agent then releases the updated session login information to the database server, and continues to monitor the session without access control (104). Database session security violations and access control to database objects are handled on the database server by DACM according to the DSP. If security violations happen, then access to database objects is denied by DACM. The ESD is still informed about access denial because LDACS monitors database server responses with database access errors.

The decision to implement the different security modes can be based on a predetermined threshold for the database traffic, but more preferably is determined directly by the ESD based on the workload and the ESD capabilities. The ESD can measure the incoming traffic rate and consider that rate in light of the ESD resources. If the ESD is not capable of managing incoming traffic (i.e., it is causing unacceptable traffic delays), then it can switch incoming sessions to DACM. ESD resources depend on various hardware factors, e.g., the number of CPU cores, available physical memory, CPU frequency, etc. This decision can be based on a time-out value at the agent, i.e., if the processing delay at the ESD would lead to a time-out for the ESD responding to the agent, then the ESD can switch to DACM control.

The present invention may be further understood with reference to an example using an Oracle database and the Oracle TNS database protocol, but those skilled in the art will appreciate that the methodology of the present invention is not limited to Oracle only. This example is seen in FIGS. 6A and 6B which shows a security violation rule transformation from LSP to DSP. This step is performed outside of the flow of access controlled database sessions. According to this example, an LSP is designated as:

If client ip address="192.168.2.100" and db_user_name="ALICE" and os_user="oracle" and action="insert" on object="EMP", then drop statement;

ESD 72 transforms this rule to a set of database statements (DSP) such as:

drop user LDACS_1 cascade;
<.......create user LDACS_1 by copying user ALICE with same grants, roles, privileges etc.>
<.....create synonyms for user LDACS_1.>
alter user LDACS_1 grant connect through ALICE;
revoke insert on EMP from LDACS_1;

This transformation allows the creation of a proxy user named "LDACS_1" to conduct the session on database server 70. ESD 72 then sends this DSP to agent 68, which applies the DSP on database server 70.

Subsequently, when database client user ALICE starts a new database session at database client 62 from IP address "192.168.2.100" as OS user "oracle", agent 68 will intercept a database protocol packet 110 with the session login information as seen in FIG. 6A. Packet 110 includes appropriate code to request authentication of user "ALICE" for a new database session with server 70. Agent 68 holds this initial session login information and sends it to ESD 72. When the database traffic for database server host 64 makes database access control desirable (box 96 of FIG. 5), ESD 72 will proceed to analyze the initial session login information by comparing its parameters to those provided in the various LSPs which have been implemented and are locally stored at ESD 72. In this case, ESD 72 verifies that the initial session login information matches the previous described LSP, i.e., (i) the IP address in the packet matches IP address "192.168.2.100", (ii) the database client operating system is "oracle", and (iii) the client user is "ALICE".

As a result of the verification ESD 72 finds the relevant DSP related to database proxy user LDACS_1 and makes change in session login information packet according to the database protocol. In this case, the change makes database user LDACS_1 (who does not have INSERT privileges on table EMP) owner of the database session started by database user ALICE. The proxy user LDACS_1 uses ALICE in order to connect to database server, but client user ALICE does not need to know the password or other authentication information for LDACS_1 (as part of the Oracle proxy user features). ESD 72 then sends a positive verdict and new session login information to agent 68. Agent 68 releases the updated session login information to database server 70 and stops access control of this database session. Agent 68 thereafter continues to work in monitoring mode (it does not hold database protocol packets and therefore does not impose any database session slow-down) and only sends intercepted packets to ESD 72.

To continue this example, suppose that client user ALICE attempts to make a change in one of the entries in the particular database being accessed. This action will result in database client 62 issuing the following statement in the database session:

INSERT INTO EMP VALUES(1).

Then according to the privileges already set for database user LDACS_1 (owner of database session) database server 70 will not let the client perform this statement, and will instead return the following error:

ORA-01031: insufficient privileges.

This and other relevant database protocol packets will be intercepted and sent to ESD 72 by agent 68. ESD 72 will thus be informed of the database statement that violated the security policy and was blocked on database server 780 by DACM.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. For example, while the foregoing implementation relates to an Oracle database system, it is equally applicable to other database systems having widely varying protocols. Also, while the invention is described in terms of two alternative security modes, it could involve more than two modes. It is therefore contemplated that such modifications can be made without departing from the spirit or scope of the present invention as defined in the appended claims.

What is claimed is:

1. A method of controlling access to a database located at a database server comprising:
   receiving a database access policy at an external security device which is separate from the database server with an agent wherein the database access policy includes at least one rule indicative of allowable access to the database server;
   translating the database access policy to one or more database objects access rules using the external security device wherein the database objects access rules include one or more database statements supported by the database server;
   installing by the agent the database objects access rules on the database server;
   receiving initial session login information from a database client at the external security device and the controlling access method subsequently performing following functions during high rate database traffic;
   determining by the external security device that the database access policy is relevant to the initial session login information;
   transforming the initial session login information into updated session login information according to the database protocol rules;
   releasing through the agent the updated session login information to the database server;
   allowing a database session at the database server for the database client in response to the updated session login information; and
   processing one or more database server access requests from the database client using the database server based on the database objects access rules.

2. The method of claim 1 further comprising monitoring database traffic for the database server in real-time, wherein said determining, said transforming, said releasing, said allowing, and said processing are performed in response to a determination, when the initial session login information is received by an agent for the database server, that the database traffic imposes a processing delay at the external security device.

3. The method of claim 2 wherein:
   the agent receives the database objects access rules from the external security device and installs the database objects access rules on the database server;
   the agent intercepts the initial session login information from the database client and transmits the initial session login information to the external security device; and
   the agent releases the updated session login information from the external security device to the database server.

4. The method of claim 1 wherein:
   said translating includes defining a proxy user for the database server and establishing privileges for the proxy user based on the database access policy; and
   the updated session information includes the proxy user.

5. The method of claim 1 wherein the database access policy includes at least a network address for the database client, a username for the database client, and a database operating system for the database client.

6. The method of claim 1 wherein the database access policy is a local database access control system (LDACS) security policy.

7. The method of claim 1, further comprising:
   receiving a specific access request from the database client at the database server;
   determining, at the database server, that the specific access request violates the database objects access rules;
   denying the specific access request by the database server; and
   sending an error response to the external security device indicating that the specific access request constitutes a violation of the database objects access rules.

8. A computer system of controlling access to a database located at a database server comprising:
   one or more hardware processors which process program instructions;
   a memory device connected to said one or more hardware processors; and
   program instructions residing in said memory device for controlling access to a database located at a database server by receiving a database access policy at an external security device which is separate from the database server with an agent which includes at least one rule indicative of allowable access to the database server, translating the database access policy to one or more database objects access rules using the external security device which include one or more database statements supported by the database server, receiving initial session login information from a database client at the external security device and subsequently performing following functions during high rate database traffic;
   determining by the external security device that the database access policy is relevant to the initial session login information,
   transforming the initial session login information into updated session login information according to the database objects access rules, and
   releasing through the agent the updated session login information to the database server to enable the database server to process one or more database server access requests from the database client.

9. The computer system of claim 8 wherein the determining, the transforming, and the releasing are performed in response to a real-time determination, when the initial session login information is received, that the database traffic imposes a processing delay at the external security device.

10. The computer system of claim 8 wherein:
the translating includes defining a proxy user for the database server and establishing privileges for the proxy user based on the database access policy; and
the updated session information includes the proxy user.

11. The computer system of claim 8 wherein the database access policy includes at least a network address for the database client, a username for the database client, and a database operating system for the database client.

12. The computer system of claim 8 wherein the database access policy is a local database access control system (LDACS) security policy.

13. The computer system of claim 8 wherein the database access policy is received from an agent of the database server which intercepts the initial session login information, and the updated session information is transmitted to the agent for release to the database server.

14. A method of hybrid database access control in a database server system having a database server, an agent for the database server and an external security device, comprising:
operating the database server system in a first security mode for a first database client wherein access to the database server is monitored by the agent subject to one or more database access policies stored at the external security device by performing following functions;
receiving the database access policies at the external security device which is separate from the database server with the agent wherein the database access policies includes at least one rule indicative of allowable access to the database server;
translating the database access policies to one or more database objects access rules using the external security device wherein the database objects access rules include one or more database statements supported by the database server;
installing by the agent the database objects access rules on the database server;
receiving initial session login information from a database client at the external security device;
monitoring database traffic for the database server in real-time;
determining that the database traffic imposes a processing delay at the external security device caused by high rate database traffic; and
responsive to said determining, switching operation of the database server system to a second security mode for a second database client wherein access to the database server is monitored by the database server subject to the database objects access rules stored at the database server and subsequently performing following functions when detecting high rate database traffic;
determining by the external security device that the database access policies are relevant to the initial session login information,
transforming the initial session login information into updated session login information according to the database objects access rules, and
releasing through the agent the updated session login information to the database server to enable the database server to process one or more database server access requests associated with the second database client.

15. The method of claim 14 wherein said determining includes comparing the database traffic to workload resources of the external security device.

16. The method of claim 14 wherein operation of the database server system in the first security mode includes:
the agent intercepting all requests sent from the first database client to the database server and forwarding the requests to the external security device;
the external security device determining whether each request should be allowed according to the database access policies and sending a verdict for a given one of the requests to the agent indicating that the given request was either allowed or not allowed; and
the agent releasing to the database server only the requests indicated by corresponding verdicts as allowed.

17. The method of claim 16 wherein the database access policies are local database access control system (LDACS) security policies.

18. The method of claim 14 wherein operation of the database server system in the second security mode includes:
the agent intercepting all requests sent from the second database client to the database server and forwarding the requests to the database server; and
the database server determining whether each request should be allowed according to the database objects access rules.

19. The method of claim 18 wherein the database objects access rules are implemented at the database server by a database access control module (DACM).

20. The method of claim 18 wherein the agent has a time-out value for receiving a verdict response from the external security device, and said determining that the database traffic imposes a processing delay at the external security device includes comparing the processing delay to the time-out value.

* * * * *